(12) United States Patent
Dods et al.

(10) Patent No.: US 7,214,008 B1
(45) Date of Patent: May 8, 2007

(54) ADJUSTABLE DRILL TEMPLATE

(75) Inventors: Bryan G. Dods, Ballwin, MO (US); Jerry Harmon, Kirkwood, MO (US); Robert W. Scott, St. Charles, MO (US); Lynn Braunschweig, St. Louis, MO (US); Raymond Slesinski, Arnold, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/264,624

(22) Filed: Nov. 1, 2005

(51) Int. Cl.
*B23B 47/28* (2006.01)
(52) U.S. Cl. .............. 408/115 R; 408/241 B
(58) Field of Classification Search ........... 408/115 R, 408/97, 103, 231 B
See application file for complete search history.

(56) References Cited

U.S. PATENT DOCUMENTS

| | | | | |
|---|---|---|---|---|
| 1,984,387 A | * | 12/1934 | Turner | 164/13 |
| 2,029,650 A | * | 2/1936 | Betz | 408/115 R |
| 2,367,582 A | * | 1/1945 | Honyoust | 408/76 |
| 4,030,854 A | * | 6/1977 | Grannis | 408/115 B |
| 4,330,228 A | * | 5/1982 | Beyl | 408/112 |
| 4,764,060 A | * | 8/1988 | Khurana | 408/14 |
| 5,054,968 A | * | 10/1991 | Eckman | 408/97 |
| 5,308,199 A | * | 5/1994 | Juang | 408/115 R |
| 5,590,986 A | * | 1/1997 | Juang | 408/115 R |

* cited by examiner

*Primary Examiner*—Monica Carter
*Assistant Examiner*—J Williams
(74) *Attorney, Agent, or Firm*—Jeffrey D. Moy; Weiss & Moy, P.C.

(57) ABSTRACT

An adjustable drill template has a base plate and a plurality of drill blocks. The drill blocks are movably coupled to the base plate. The drill blocks can move along the length of the base plate so that the drill blocks can be configured to conform to a desired hole pattern. A locking device coupled to each drill block will hold each drill block in a desired position.

15 Claims, 3 Drawing Sheets

ADJUSTABLE DRILL TEMPLATE

BACKGROUND OF THE INVENTION

1. Field of the Invention

The present invention relates generally to a drill template, and more particularly, to an adjustable drill template which can be configured to conform to a plurality of different hole patterns.

2. Background Information

In many industries, it is difficult to replace existing components with newer ones due to the difficulty in accurately aligning and drilling mounting holes in the newer component. This is especially true in the aerospace industry. In general, aerospace personnel have difficulty in properly aligning and drilling mounting holes in new components such as aircraft skins when replacing existing ones. For large production runs, special production tools may be designed to properly align and form the mounting holes on new components. However, these production tools can be expensive to design and build. Thus, for limited or small production runs, these production tools are cost prohibitive.

If production tools are cost prohibitive, mounting holes may be formed by back drilling. Back drilling is performed by laying an existing component over the new component. Mounting holes are then marked and drilled. However, back drilling is a slow process and is fairly inaccurate. Furthermore, many mounting holes are not accessible to back drilling due to the location of the mounting hole, the size/shape of the component, etc. If back drilling cannot be performed, mounting holes are generally laid out by hand and hand drilled using drill blocks or eggcups. This technique is a very slow and inaccurate process. Inaccurate drilling of mounting holes may lead to the scrapping of the component.

Therefore, it would be desirable to provide a drill template that overcomes the above problems. The drill template would be adjustable and could be configured to conform to a plurality of different hole patterns.

SUMMARY OF THE INVENTION

An adjustable drill template has a base plate. A plurality of drill blocks are removably coupled to the base plate. A locking device is coupled to each of the plurality of drill blocks.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
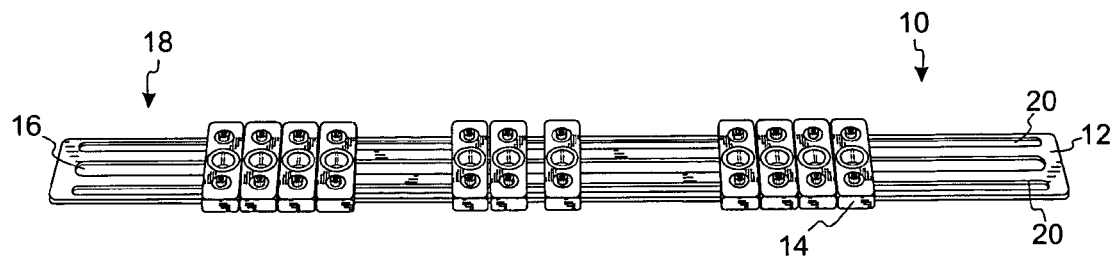
FIG. 1 is an elevated perspective view illustrating a first advantageous embodiment of the present invention having a substantially straight base plate.

With reference now to the Figures, and in particular with reference to FIG. 1, an adjustable drill template 10 is shown. The drill template 10 has a base plate 12 and a plurality of drill blocks 14.

The base plate 12 holds a plurality of drill blocks 14. The drill blocks 14 are movably coupled to the base plate 12. The drill blocks 14 can move along the length of the base plate 12 so that the drill blocks 14 can be configured to conform to a desired hole pattern and then locked into position.

The base plate 12 has a first channel 16 formed therein. The first channel 16 runs a majority of the length of the base plate 12 and along a central area of the width of the base plate 12. The first channel 16 allows a drill bit to pass through the base plate 12 in order to drill a hole in a desired object.

The base plate 12 may have a track 18. The drill blocks 14 move in the track 18 allowing the drill blocks 14 to slide along the base plate 12. The track 18 further keeps the drill blocks 14 from sliding off of the base plate 12. In the embodiment depicted in FIG. 1, the track 18 has a pair of channels 20. The pair of channels 20 runs a majority of the length of the base plate 12. The pair of channels 20 are positioned on the base plate 12 such that the first channel 16 runs between and approximately parallel to the pair of channels 20.

Figure 2:
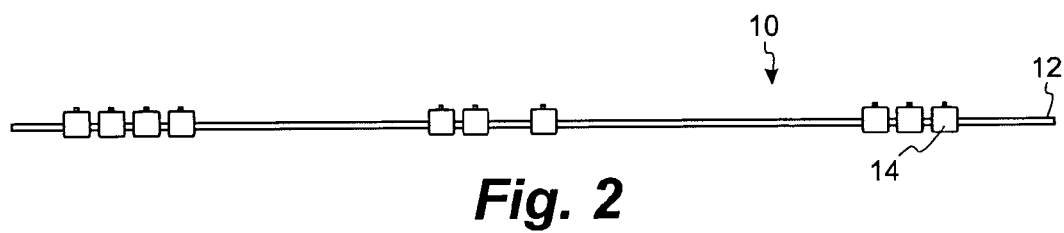
FIG. 2 is a side view of the first advantageous embodiment of the present invention having a substantially straight base plate.
Figure 2A:
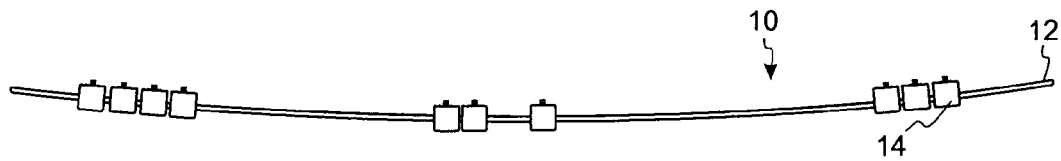
FIG. 2A is a side view of the first advantageous embodiment of the present invention having a substantially straight base plate showing the flexibility of the adjustable drill template.

Referring now to FIGS. 1–2A, the base plate 12 is formed of a thin sheet of material. The material used for the base plate 12 may be a semi-rigid material. This will allow the base plate 12 to flex as shown more clearly in FIG. 2A. The ability of the base plate 12 to flex allows the drill template 10 to bend in order to conform to different contoured surfaces of the object to be drilled. However, to prevent possible misalignment when drilling holes, the material should not be too malleable. If the material used to form the base plate 12 is too malleable, the base plate 12 may bend during usage thus possibly causing misalignment of holes. For example, when the pressure of a drill is exerted on the drill template 10, the pressure may cause the base plate 12 to bend. This may cause inaccuracy in the drilling of the holes. Materials that may be used for the base plate 12 include, but are not limited to: sheet metal, aluminum, stainless steel material, plastic, and the like. The above are given as examples and should not be seen as to limit the scope of the present invention.

Figure 3:
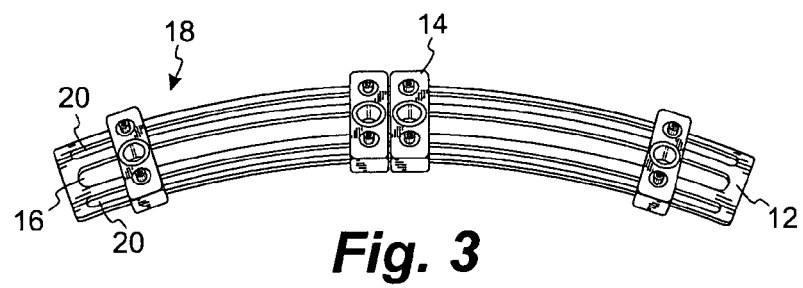
FIG. 3 is an elevated perspective view of the first advantageous embodiment of the present invention having a curved base plate.

As shown in FIGS. 1–2A, the base plate 12 may be approximately straight. However, the base plate 12 may be formed in different lengths and configurations. Referring now to FIG. 3, the drill template 10 has a base plate 12 that has a curved configuration. The first channel 16 and the pair of channels 20 are also curved to conform to the curvature of the base plate 12.

Figure 4:
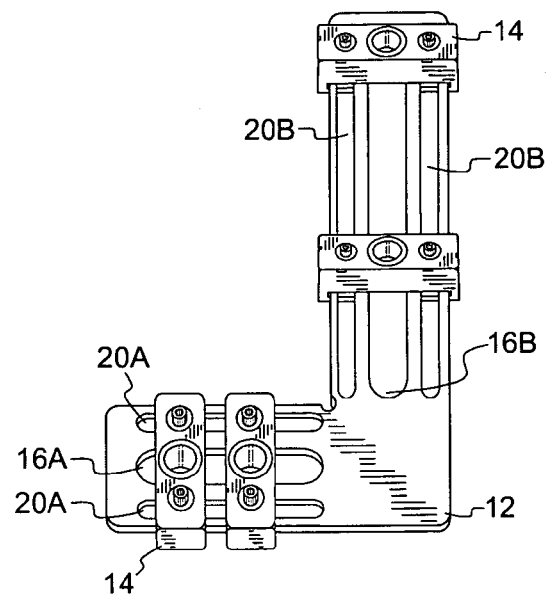
FIG. 4 is an elevated perspective view illustrating the first advantageous embodiment of the present invention having an "L" shaped base plate.

Referring now to FIG. 4, the drill template 10 has a base plate 12 that has an "L" configuration. The first channel 16 and the pair of channels 20 are also formed to conform to the "L" configuration of the base plate 12. The first channel 16 has a first section 16A which runs a majority of the length of the horizontal member of the "L" shaped base plate 12. The first channel 16 also has a second section 16B which runs a majority of the length of the vertical member of the "L" shaped base plate 12. The pair of channels 20 is formed in a similar manner having a first section 20A which runs a majority of the length of the horizontal member of the "L" shaped base plate 12 and a second section 20B which runs a majority of the length of the vertical member of the "L" shaped base plate 12.

Figure 5:
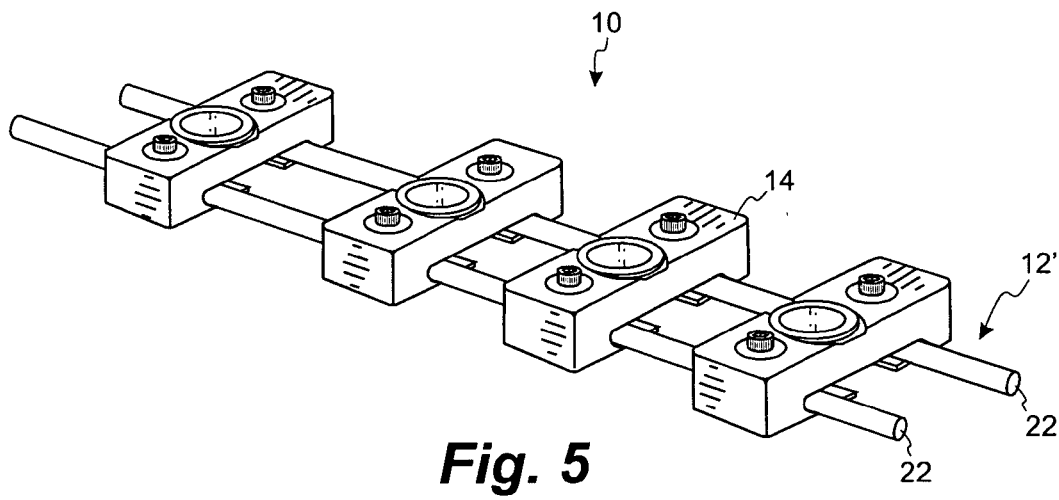
FIG. 5 is elevated perspective view illustrating a second advantageous embodiment of the present invention.

Referring now to FIG. 5, another embodiment of the base plate 12' is shown. In this embodiment, the base plate 12' has a pair of rails 22. The rails 22 hold a plurality of drill blocks 14. The drill blocks 14 are movably coupled to the rails 22 to allow the drill blocks 14 to slide along the rails 22 and lock into a proper location. The drill blocks 14 can move along the length of the rails 22 so that the drill template 10 can be configured to conform to a plurality of different hole patterns. The rails 22 may be formed into a plurality of different lengths and configurations to allow base plate 12' to have similar configurations to that shown in the previous Figures.

Figure 6:
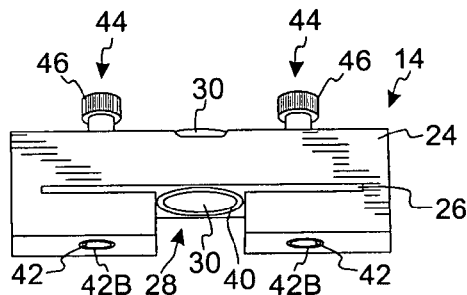
FIG. 6 is a perspective view of a first advantageous embodiment of the drill blocks used in the present invention.

Referring to FIG. 6, the drill block 14 used in the previous Figures is shown in detail. The drill block 14 has a body member 24. The body member 24 may be formed in different sizes and shapes. In the embodiment depicted in the Figures, the body member 24 is substantially rectangular in shape. However, this is given as an example and should not be seen as to limit the scope of the present invention. The body member 24 may be formed out of a plurality of different materials. The body member 24 may be formed of nylon, mylar, plastic, wood, metal or the like. The aforementioned is given as an example and should not be seen as to limit the scope of the present invention.

The body member 24 has a slot 26. The slot 26 runs horizontally along the width of the body member 24. The slot 26 is wide enough to allow the base plates 12 and 12' to move through the slot 26 so that the drill blocks 14 can move along the length of the base plate 12.

A void 28 is formed on the bottom surface of the body member 24. The void 28 is centrally located on the bottom surface of the block 24 and runs up to the slot 26. An opening 30 is formed in the top surface of the body member 24. The opening 30 is centrally located on the top surface of the body member 24 and above the void 28. The opening 30 is formed in the top surface of the body member 24 and runs though the body member 24 into the void 28. The void 28 opening 30 allows a drill bit to pass through the body member 24 in order to drill a hole in a desired object.

A bushing 40 is placed in the opening 30. The bushing 40 is generally a metal bushing 40. The bushing 40 is used to guide the drill bit through the opening 30 in order to drill a hole in a desired object. The bushing 40 may be a removable bushing 40. This will allow different size bushings 40 to be placed in the opening 30 to accommodate different size drill bits. Alternatively, a second bushing may be inserted into the bushing 40 to accommodate different size drill bits.

A pair of holes 42 is formed in the top surface of the body member 24. The pair of holes 42 extends through the top surface of the body member 24, through the slot 26 and out the bottom surface of the body member 24. The pair of holes 42 is formed so that the opening 30 is positioned between pair of holes 42.

A locking device 44 is placed in each hole 42. The locking devices 44 are used to secure the drill blocks 14 to the base plate 12 and to lock the drill blocks 14 to lock the base plate 12. In accordance with one embodiment, the locking device 44 has each hole 42 threaded. A threaded insert 42B may be used to prevent the threads from stripping. A locking bolt 46 is placed in each threaded hole 42. Each locking bolt 46 is placed in each threaded hole 42, so that one of the locking bolts 46 will extend through each of the pair of channels 20 to secure the drill blocks 14 to the base plate 12. Alternatively, each locking bolt 46 is placed in each threaded hole 42, so that one of the locking bolts 46 will secure each rail 22 in the drill block 14. The drill blocks 14 can move along the length of the rails 22 so that the drill template 10 can be configured to conform to a plurality of different hole patterns. By rotating the locking bolt 46 in a first direction, the locking bolt 46 will lock the drill blocks 14 to the base plate 12 or to each rail 22. By rotating the locking bolt 46 in a second direction, the locking bolt 46 will allow the drill blocks 14 to slide along the base plate 12 or along each rail 22 so that the drill block 14 can be configured to a desired hole pattern. By continuing to rotate the locking bolt 46 in the second direction, the locking bolt 46 may be removed from the drill blocks 14 so that the drill block 14 may be removed from the base plate 12.

Figure 6A:
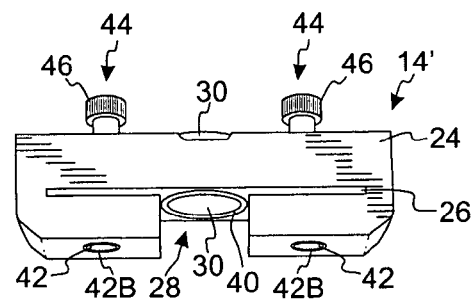
FIG. 6A is a perspective view of a second advantageous embodiment the drill blocks used in the present invention.

Referring to FIG. 6A, another embodiment of the drill block 14' used in the previous Figures is shown in detail. The drill block 14' is similar to that drill block 14 previously shown in FIG. 6. The main difference is that the bottom side edges are rounded.

Figure 7:
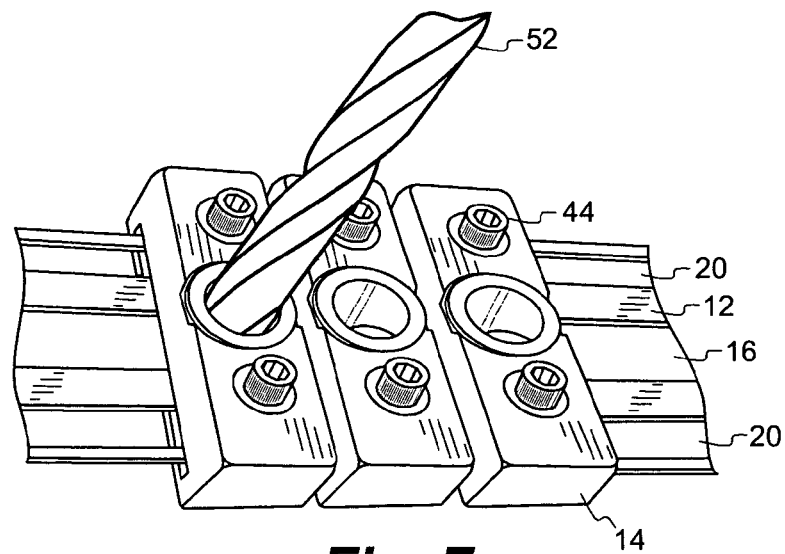
FIG. 7 is a magnified view of drill blocks used in the present invention.
Figure 8:
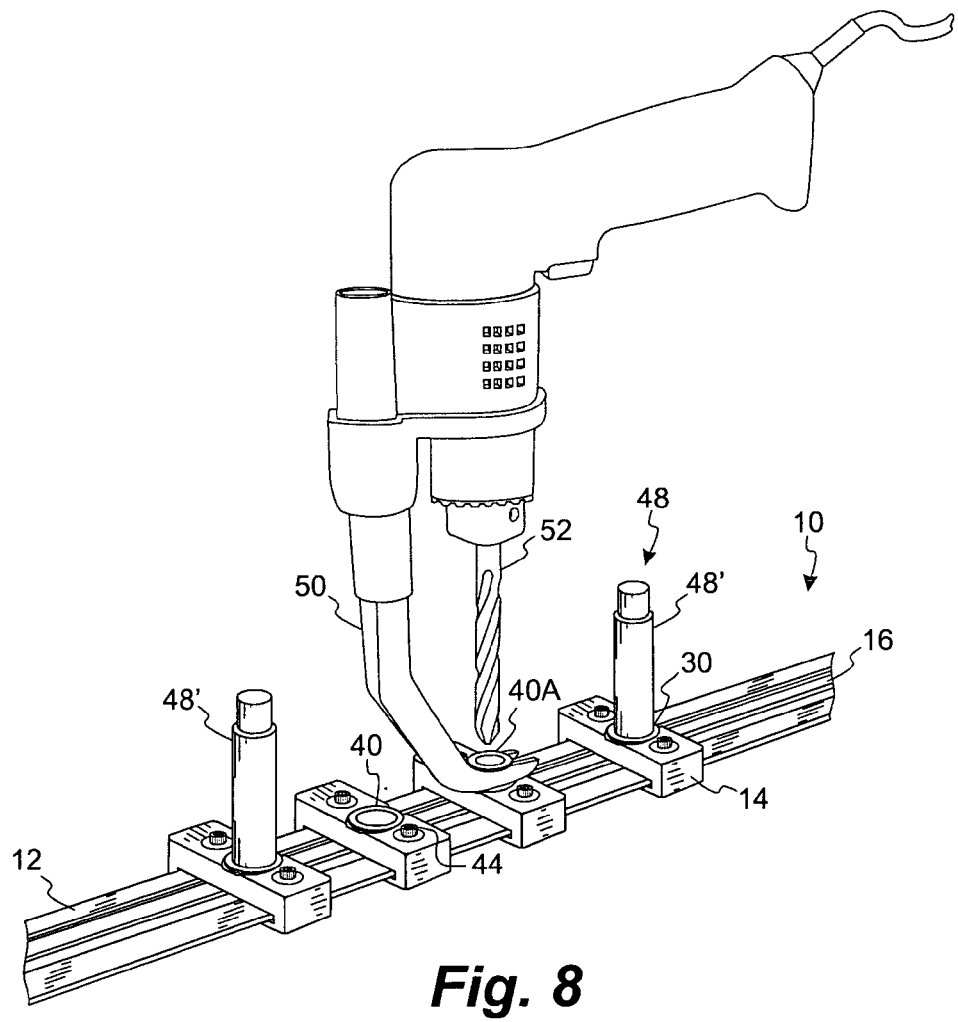
FIG. 8 is an elevated perspective view of the adjustable drill template of the present invention with a drill press coupled thereto.

Referring to FIGS. 7–8, the use of the drill template 10 will be described. The drill template 10 is configured to a desired hole pattern. To configure the drill template 10, the locking bolts 44 are loosened to allow the drill blocks 14 to slide along the base plate 12 or along the rail 22. If required, additional drill blocks 14 may be added to the base plate 12. To add additional drill blocks 14, the base plate 12 is inserted into the slot 26 of the added drill blocks 14. A locking bolt 44 is placed in each threaded hole 42 of each additional drill block 14 to be added. The locking bolts 44 will extend through each of the pair of channels 20 to secure the drill blocks 14 to the base plate 12. Alternatively, each locking bolt 44 is placed in each threaded hole 42, so that one of the locking bolts 44 will secure each rail 22 in the drill block 14. The added drill blocks 14 are then slid along the base plate 12 or along the rail 22 to a desired location.

Once each drill block 14 is placed in a desired location, the locking bolts 44 are rotated to lock the drill blocks 14 to the base plate 12 or to each rail 22. The drill template 10 is then placed on a desired object to where the desired hole pattern is to be laid.

The drill template 10 is secured to the object by a clamping device 48 to prevent the drill template 10 from moving. Any type of clamping device 48 may be used. For example, a "C" clamp, a claw clamp, a face clamp, and the like may be used. The listing of the aforementioned is given as an example and should not be seen as to limit the scope of the present invention. In accordance with one embodiment, the clamping device 48 is a pin clamp 48'. The pin clamp 48' is positioned through the opening 30 as shown in FIG. 8. The pin clamp 46' is then tightened to secure the drill template 10 to the object.

A drill 49 is then secured to a desired drill block 14 using a brace 50. A second bushing 40A is coupled to the end of the brace 50. The second bushing 40A is then inserted into the first bushing 40. The brace 50 and the second bushing 40A are used to keep the drill bit 52 approximately perpendicular to the surface to be drilled. Alternatively, the brace 50 is coupled to removable bushing 40 which is then inserted into the opening 30. The drill 48 is then lowered so that the drill bit 52 is inserted into the bushing 40 of the desired drill block 14 in order to drill a hole in a desired object. The process is then repeated for the remaining drill blocks 14.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. An adjustable drill template comprising:
    a base plate;
    a plurality of drill blocks removably coupled to the base plate wherein each drill block comprises:
        a body member;
        a slot formed in the body member and running horizontally along a width of the body member, the slot allows the base plate to move through the slot;
        a void area formed on a central bottom surface of the body member, the void area running from the bottom surface of the body member to the slot; and
        an opening formed in a central top surface of the body member and running though the body member into the void area;
    a locking device coupled to each of the plurality of drill blocks; and
    a brace removably coupled to any of the plurality of drill blocks, the brace securing a drill to a desired drill block to keep a drill bit of the drill approximately perpendicular to a surface to be drilled.

2. An adjustable drill template in accordance with claim 1 wherein the base plate comprises:
    a plate member; and
    a first channel formed in the plate member, the first channel running a majority of the length of the base plate and along a central area of the width of the plate member.

3. An adjustable drill template in accordance with claim 2 wherein the base plate further comprises a track formed on a top surface of the plate member to allow the drill blocks to slide along the base plate and to prevent the drill blocks from sliding off of the base plate.

4. An adjustable drill template in accordance with claim 3 wherein the track comprises a pair of channels formed on the top surface of the plate member, the pair of channels running a majority of the length of the plate member, the first channel running between and approximately parallel to the pair of channels.

5. An adjustable drill template in accordance with claim 2 wherein the plate member is semi-rigid.

6. An adjustable drill template in accordance with claim 1 wherein the base plate comprises a pair of rails.

7. An adjustable drill template in accordance with claim 6 wherein the pair of rails is semi-rigid.

8. An adjustable drill template in accordance with claim 1 wherein each drill block further comprises a pair of holes extending through the top surface of the body member, through the slot and out a bottom surface of the body member.

9. An adjustable drill template in accordance with claim 8 wherein the opening is positioned between the pair of holes.

10. An adjustable drill template in accordance with claim 1 wherein each drill block further comprises a bushing positioned in the opening.

11. An adjustable drill template in accordance with claim 8 wherein the locking device comprises a locking bolt placed in each of the pair of holes.

12. An adjustable drill template in accordance with claim 11 wherein the locking device further comprises a threaded insert placed in each of the pair of holes.

13. An adjustable drill template comprising:
    a track, wherein the track is a pair of rails;
    a plurality of drill blocks removably coupled to the track wherein each drill block comprises:
        a body member;
        a slot formed in the body member and running horizontally along a width of the body member, the slot allows the base plate to move through the slot;
        a void area formed on a central bottom surface of the body member, the void area running from the bottom surface of the body member to the slot; and
        an opening formed in a central top surface of the body member and running though the body member into the void area;
    a locking device coupled to each of the plurality of drill blocks; and
    a brace removably coupled to any of the plurality of drill blocks, the brace securing a drill to a desired drill block to keep a drill bit of the drill approximately perpendicular to a surface to be drilled.

14. An adjustable drill template in accordance with claim 1 further comprising at least one pin clamp, the pin clamp positioned through the opening formed in a central top surface of the body member in one of the plurality of drill blocks to secure the drill template to an object to be drilled.

15. An adjustable drill template in accordance with claim 13 further comprising at least one pin clamp, the pin clamp positioned through one of the plurality of drill blocks to secure the drill template to an object to be drilled.

* * * * *